United States Patent
Stout

[15] 3,693,718
[45] Sept. 26, 1972

[54] LASER BEAM DEVICE AND METHOD FOR SUBTERRANEAN RECOVERY OF FLUIDS

[72] Inventor: Daniel W. Stout, Lake Park, Fla.

[73] Assignees: Paul C. Washburn, David J. Rupp, Erwin D. Latimer and Henry McGinnes all of Palm Beach, Fla. part interest to each

[22] Filed: Aug. 17, 1970

[21] Appl. No.: 64,436

[52] U.S. Cl. ............... 166/302, 166/60, 175/16, 331/94.5
[51] Int. Cl. .................................... E21b 43/24
[58] Field of Search ........... 166/302, 303, 57, 60, 65; 175/16; 299/14; 331/94.5; 330/4.3; 240/41.25

[56] References Cited

UNITED STATES PATENTS

| | | | |
|---|---|---|---|
| 3,539,221 | 11/1970 | Gladstone | 175/16 X |
| 3,541,468 | 11/1970 | Hammond et al. | 331/94.5 |
| 1,510,655 | 10/1924 | Clark | 166/302 |
| 1,887,650 | 11/1932 | Larner et al. | 240/41.25 |
| 3,265,855 | 8/1966 | Norton | 331/94.5 X |
| 3,289,101 | 11/1966 | Masters et al. | 331/94.5 |
| 3,310,753 | 3/1967 | Burkhalter | 331/94.5 |
| 3,461,964 | 8/1969 | Venghiattis | 175/16 X |
| 3,493,060 | 2/1970 | Van Dyk | 166/302 X |
| 3,522,842 | 8/1970 | New | 166/303 X |
| 3,544,165 | 12/1970 | Snedden | 299/14 |

FOREIGN PATENTS OR APPLICATIONS

| | | | |
|---|---|---|---|
| 1,119,948 | 7/1968 | Great Britain | 331/94.5 |

*Primary Examiner*—Ernest R. Purser
*Attorney*—Clarence A. O'Brien and Harvey B. Jacobson

[57] ABSTRACT

Monochromatically identical beams emitted from a plurality of laser devices positioned in radial relation to a common optical axis along which a composite beam of concentrated energy is projected. A rotatable reflective lens device located a remote distance from the source of the composite beam directs the composite beam transverse to the common optical axis. The direction of the common optical axis and the concentration of the laser beams are adjustable.

16 Claims, 6 Drawing Figures

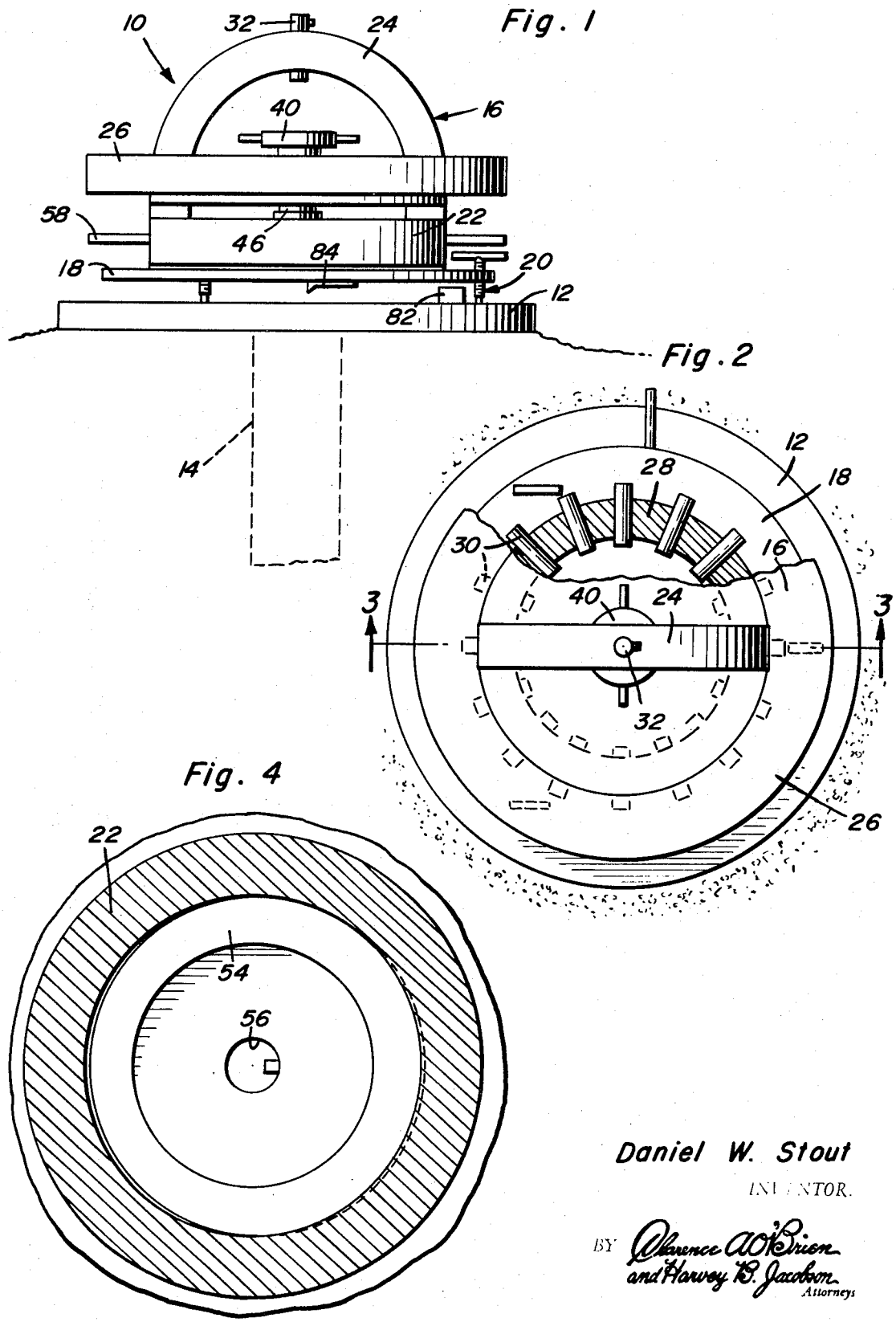

Daniel W. Stout
INVENTOR by Clarence A. O'Brien
and Harvey B. Jacobson
Attorneys

LASER BEAM DEVICE AND METHOD FOR SUBTERRANEAN RECOVERY OF FLUIDS

The use of laser beam energy in subterranean recovery operations has already been proposed as disclosed for example in U.S. Pat. No. 3,461,964 to Venghiatis and U. S. Pat. No. 3,493,060 to Van Dyk. However, prior apparatus and methods utilizing laser beam energy, were extremely limited and impraticable because of a lack of directional and depth control over the laser beam energy. Further, prior methods and apparatus are incapable of concentrating sufficient laser beam energy at a desired subsurface location without reliance on relatively massive laser beam generators creating constructional and heat dissipation problems incident thereto. It is therefore an important object of the present invention to provide an apparatus and method by means of which laser beam energy of a desired quantity may be concentrated at a remote and relatively inaccessible location without the drawbacks of prior art apparatus and methods and with directional and depth control over laser beams through which energy is transmitted and concentrated.

In accordance with the present invention, a plurality of conventional laser beam generators are mounted by a frame assembly above ground surface in alignment with a bore hole communicating with a subterranean cavity from which recovery of additional oil and gas reserves is desired. The laser devices are positioned in radial relation to a common optical axis and are matched to obtain an in-phase condition by emitting monochromatically identical beams which travel the same distance and are reflected downwardly along closely spaced paths parallel to the common optical axis. The individual laser beams are adjustably concentrated into a composite laser beam by a condensing type focusing lens. The amount of concentration of the laser beam energy is varied by axial adjustment of a reflecting lens on which the individual laser beams impinge at incident angles of 45°. A reflecting device rotatable about a rotational axis aligned with the common optical axis of the composite laser beam is mounted by a sealing device within the cavity so as to reflect the composite beam of concentrated energy transversely into the rock strata enclosing the cavity for drilling the same in a horizontal plane to a predetermined penetration. The cavity may be filled with an inert fluid such as liquid nitrogen during drilling operations. Precision adjusting and aligning means are provided so as to provide directional and depth control.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of the apparatus of the present invention at a typical installation.

FIG. 2 is a top plan view of the apparatus shown in FIG. 1.

FIG. 4 is a partial transverse sectional view taken substantially through a plane indicated by section line 4—4 in FIG. 3.

Figure 3:
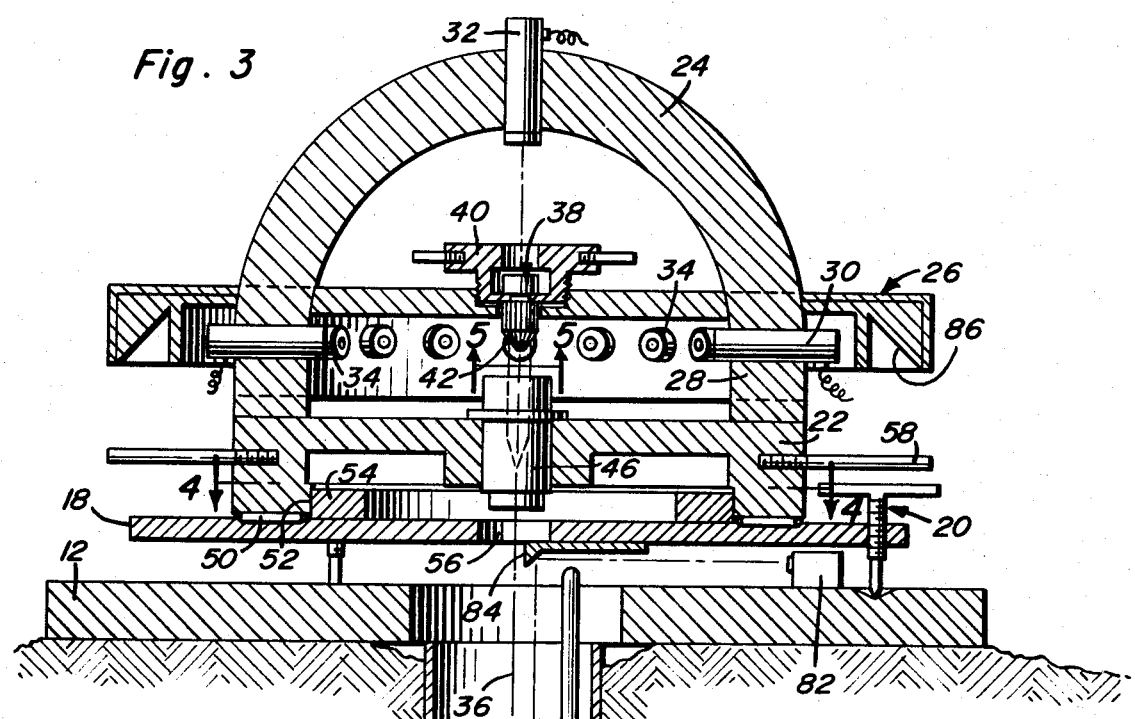
FIG. 3 is an enlarged side sectional view taken substantially through a plane indicated by section line 3—3 in FIG. 2.

Referring now to the drawings in detail, FIGS. 1 and 2 show the apparatus of the present invention generally denoted by reference numeral 10 installed at a location designed for recovery of oil and gas reserves remaining in various strata of oil or gas bearing rock at some subsurface location. A typical installation for the apparatus 10, for example, would be a recovery well location that was heretofore classified as "plugged" or "capped" following cessation of normal recovery operations. The apparatus 10 is mounted at such a location above surface by means of an annular base plate 12 aligned above the bore hole 14 as shown by dotted line in FIG. 1 in order to support thereabove a mounting frame assembly generally referred to by reference numeral 16. The frame assembly includes a levelling plate or disk 18 supported in adjustably space relation on top of the base plate 12 by a plurality of level adjusting devices 20 which threadedly extend through the levelling plate adjacent the outer periphery thereof. Supported on the levelling plate 18 is an external mounting ring 22 to which an inverted U-shaped frame member 24 is secured. The frame member 24 thereby straddles the top of the bore hole and mounts a protective shield 26 thereabove. Also supported by the frame member 24 spaced above the mounting ring 22 is an annular housing 28 as shown in FIG. 2 supporting a plurality of laser beam generators generically referred to as quantum devices 30. The quantum or laser devices 30 are well known to those skilled in the art as emitting a beam of coherent monochromatic electromagnetic energy. These laser devices 30 are positioned in radial relation to a common optical axis extending through and aligned with the axis of a reference laser beam generator 32 vertically positioned at the top of the frame member 24 so that the distance traveled by the energy outputs or the length of the beams are equal. Further, the laser devices 30 and 32 are matched so as to emit individual laser beams, that are monochromatically identical and thereby obtain an in-phase relationship.

Figure 5:
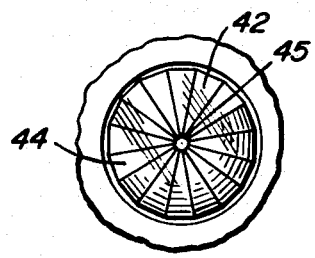
FIG. 5 is a partial bottom plan view of a portion of the apparatus as viewed from section line 5—5 in FIG. 3.

Referring now to FIG. 3 in particular, each of the laser devices 30 includes at its discharge end, a condensing type of focusing lens 34 from which a concentrated laser beam is directed in a radial direction relative to the common optical axis 36 that extends through the geometrical center of the mounting ring 22. The laser device 32 on the other hand emits a beam from its condensing lens aligned with said common optical axis. The optical axis and the beam emitted from the laser device 32 also extend through the geometrical center of a reflector device 38 that is mounted by an adjustment wheel 40, externally threaded for axial positioning along the common optical axis 36 as shown in FIG. 3. The device 38 is provided with a converging, multiple faceted surface 42 having a plurality of faces 44 that converge toward a flat, non-reflective surface 45 as more clearly seen in FIG. 5 parallel to the radial plane of the laser devices 30. The faces 44 correspond in number to the laser devices 30. The individual beams emitted by the laser devices 30 impinge on corresponding faces 44 at incident angles of 45° so as to be reflected downwardly parallel to the common optical axis 36. The reflector device 38 is axially adjusted through the adjustment wheel 40 in order to vary the spacing between the parallel paths along which the individual beams are reflected. Also, the points of impingement of the individual beams on the faces 44 are equidistant from the associated laser devices 30 and the reference laser device 32 projecting its beam through the center of the surface 45, so that the energy transmitted from the laser devices will be in resonance for concentration within the composite beam formed by the closely spaced individual laser beams reflected from the faces 44 of the device 38. The parallel spaced, reflected laser beams are transmitted through a condensing type focusing lens 46 centrally mounted by the mounting ring 22 in axial alignment with the optical axis 36.

Figure 6:
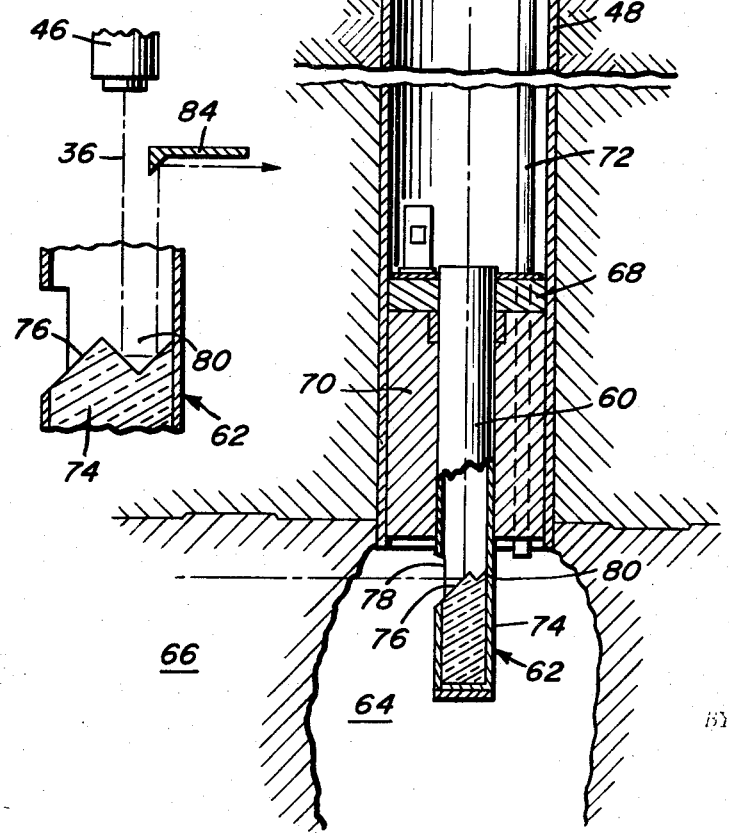
FIG. 6 is an enlarged section view of a portion of the apparatus illustrated in FIG. 3, shown in a beam regulating position.

In order to directionally control the optical axis 36 of the composite laser beams, emitted from the focusing lens 46, the levelling plate 18 is precision adjusted by means of the level devices 20 aforementioned. Thus, through the levelling devices 20 and the levelling plate 18, the radially positioned laser devices 30 may be aligned in a generally horizontal plane perpendicular to the common optical axis 36 in order to have the optical axis 36 of the composite laser beam extend downwardly through the bore hole 14 lined by the bore hole casing 48. The optical axis 36 may be angularly displaced between an operating position as shown in FIG. 3 aligned with the longitudinal axis of the bore hole and a regulating position as shown in FIG. 6. Toward this end, bearings 50 rotatably support the mounting ring on the levelling plate 18 while an eccentric circular bearing surface 52 on the mounting ring 22 engages an eccentric bearing surface 54 on the levelling plate surrounding the central opening 56 in the levelling plate through which the composite laser beam is projected into the bore hole. Thus, by angularly positioning the mounting ring through the handles 58, the optical axis 36 may be displaced 180° from its operating position eccentrically related and parallel to the longitudinal axis of the bore hole casing 48 in order to controllably adjust the composite laser beam while the optical axis is in the regulating position as hereafter explained.

When the optical axis 36 of the composite laser beam is directionally adjusted parallel to the longitudinal axis of the bore hole casing 48, it will also be parallel the tubular casing 60 of a reflective prism device 62 which is positioned within a sub-surface cavity 64 into which the bore hole 14 extends. The cavity 64 may be enclosed for example by a rock formation 66 from which recovery of additional oil and gas reserves is desired. The tubular housing 60 of the reflective prism device may be suspended from a rotatable mounting member 68 for rotational positioning thereof about the bore hole axis in order to direct the composite laser beam in a desired direction. Also, the tubular housing of the lens device may extend through a sealing device 70 positioned within the lower end of the bore hole casing 48 in order to seal an inert fluid under pressure within the cavity 64 such as liquid nitrogen and thereby control the recovery of fluid from the formation during drilling operations. A pressure relief or vent pipe 72 extends through the sealing device 70 for providing fluid communication between the cavity 64 and atmosphere above surface.

A solid state reflecting element 74 is mounted at the lower end of the tubular housing 60 within the cavity 64 and is provided with a reflecting face 76 from which concentrated laser beam energy is reflected through an opening 78 in the housing in order to direct the concentrated energy into the surrounding rock formation 66 at a predetermined depth. The composite laser beam must of course be accurately adjusted by the adjusting structure aforementioned so as to impinge entirely upon the reflecting face 76 when the optical axis is in the operating position. When the optical axis 36 is displaced to its regulating position as shown in FIG. 6, adjustments may be made through reflector device 38 until reflected energy from reflecting portions 80 of the solid state element 74 produces a desired image pattern on a visual monitoring unit such as a cathode ray tube (not shown) connected to detector device 82 mounted on the base plate 12 for receiving reflected energy from the reflector 84 mounted on the underside of levelling plate 18 radially overlapping central opening 56. Thus, precise visual adjustment is made possible for obtaining alignment of the individual laser beams with the optical axis using laser device 32 as well as exact pattern adjustments of each laser device 30 either before or after adjustment of beam concentration. The detector device 82 will be provided with a double grid polarized stop in order to prevent damage or injury from reflected laser beam energy. Protection from reflected laser beam energy is also provided for by the shield 26 having a double-grid polarizer and a downwardly reflecting surface 86 as shown in FIG. 3.

Although the apparatus as hereinbefore described is particularly suited for subsurface drilling operations, it will be appreciated that it may be also useful in connection with other installations wherever concentrated laser beam energy is to be directed toward a relatively inaccessible location remote from the energy source or whenever high concentrations of quantum energy are required. The number of laser devices utilized in addition to the reference laser device 32 required for adjustment and matching of the other laser devices 30, will depend upon the output power of the individual laser devices 30 and the total power required in a concentrated beam.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a method of recovering subterranean reserves from a formation cavity through a bore hole, the steps of: positioning a plurality of widely spaced quantum devices above the bore hole aligned in a generally horizontal plane; projecting beams emitted from said quantum devices along closely spaced parallel paths extending through the bore hole into the formation cavity; and reflecting the parallel beams within the cavity transversely into the formation.

2. In a method of recovering subterranean reserves from a formation cavity through a bore hole, the steps of: positioning a plurality of laser devices above the bore hole aligned in a generally horizontal plane; projecting beams emitted from said laser devices along closely spaced parallel paths extending through the bore hole into the formation cavity; reflecting the parallel beams within the cavity transversely into the formation, and sealing an inert fluid under pressure within the cavity.

3. The method of claim 2 wherein said beams are of equal length from the laser devices to said parallel paths and monochromatically identical.

4. The method of claim 1 wherein said beams are of equal length from the quantum devices to said parallel paths and monochromatically identical.

5. Apparatus for use in recovering subterranean reserves from a formation cavity through a bore hole, including a plurality of widely spaced quantum devices emitting individual beams, frame means for positioning said quantum devices to direct said beams of coherent monochromatic electromagnetic energy in radial relation toward a common optical axis extending through the bore hole, lens means operatively mounted on the frame means for projecting said beams along closely spaced paths parallel to said common optical axis to form a composite beam of concentrated energy, and reflective means positioned within the cavity for reflecting the composite beam transversely into the formation at a predetermined depth.

6. The combination of claim 5 including adjusting means for directionally deflecting the common optical axis and the spacing between said parallel paths.

7. Apparatus for use in recovering subterranean reserves from a formation cavity through a bore hole, including a plurality of laser devices emitting individual beams, frame means for positioning said laser devices to direct said beams in radial relation toward a common optical axis extending through the bore hole, lens means operatively mounted on the frame means for projecting said beams along closely spaced paths parallel to said common optical axis to form a composite beam of concentrated energy, reflective means positioned within the cavity for reflecting the composite beam transversely into the formation at a predetermined depth, adjusting means for directionally deflecting the common optical axis and the spacing between said parallel paths, and means for sealing an inert gas under pressure within the cavity.

8. The combination of claim 7 including means mounted by the sealing means for rotatably positioning the reflective means relative to a rotational axis aligned with the common optical axis by the adjusting means.

9. The combination of claim 8 wherein said lens means includes an axially adjustable reflecting device having a multiple faceted, converging reflecting surface on which the individual beams from the laser devices impinge at a common incident angle, a focusing lens mounted by the frame means in axially spaced alignment with the reflecting device for converging the individual beams reflected from the multiple faceted reflecting surface into said composite beam.

10. The combination of claim 9 including a reference laser device mounted by the frame means in optical alignment with said common optical axis, all of the laser devices being equidistant from the multiple faceted reflecting surface of the reflecting device.

11. The combination of claim 5 wherein said lens means includes an axially adjustable reflecting device having a multiple faceted, converging reflecting surface on which the individual beams from the laser devices impinge at incident angles of 45°, a focusing lens mounted by the frame means in axially spaced alignment with the reflecting device for converging the individual beams reflected from the multiple faceted reflecting surface into said composite beam.

12. The combination of claim 11 including a reference laser device mounted by the frame means in optical alignment with said common optical axis, all of the quantum devices being equidistant from the multiple faceted reflecting surface of the reflecting device.

13. Apparatus for directing a concentrated beam of energy at a remote location including a plurality of quantum devices emitting monochromatically identical beams, frame means for positioning said quantum devices to direct said beams in radial relation toward a common optical axis, lens means operatively mounted on the frame means for projecting said beams along closely spaced paths parallel to said common optical axis to form said concentrated beam of energy, and reflective means positioned in optical alignment with said common optical axis at a predetermined distance from the lens means for reflecting the concentrated beam transversely of the common optical axis.

14. The combination of claim 13 including adjusting means for directionally deflecting the common optical axis and the spacing between said parallel paths.

Apparatus for directing a concentrated beam of energy at a remote location including a plurality of laser devices emitting monochromatically identical beams, frame means for positioning said laser devices to direct said beams in radial relation toward a common optical axis, lens means operatively mounted on the frame means for projecting said beams along closely spaced paths parallel to said common optical axis to form said concentrated beam of energy, and reflective means positioned in optical alignment with said common optical axis at a predetermined distance from the lens means for reflecting the concentrated beam transversely of the common optical axis, said lens means including an axially adjustable reflecting device having a multiple faceted, converging reflecting surface on which the individual beams from the laser devices impinge at incident angles of 45°, a focusing lens mounted by the frame means in axially spaced alignment with the reflecting device for converging the individual beams reflected from the multiple faceted reflecting surface into said composite beam.

16. The combination of claim 15 including a reference laser device mounted by the frame means in optical alignment with said common optical axis, all of the laser devices being equidistant from the multiple faceted reflecting surface of the reflecting device.

* * * * *